United States Patent
Riley

[15] 3,662,275
[45] May 9, 1972

[54] MANUAL/AUTOMATIC STATION FOR USE IN PROCESS CONTROL SYSTEMS

[72] Inventor: John E. Riley, Saugus, Mass.
[73] Assignee: General Electric Company
[22] Filed: Oct. 1, 1970
[21] Appl. No.: 77,104

[52] U.S. Cl. ...................330/1 A, 318/591, 328/1, 328/71, 330/51, 330/110
[51] Int. Cl. ...................H03f 1/34
[58] Field of Search...............330/51, 110, 1 A; 328/1, 71; 318/591, 615, 635, 678, 681

[56] References Cited

UNITED STATES PATENTS 3,068,387  12/1962  Koppel ...................318/591

*Primary Examiner*—Roy Lake
*Assistant Examiner*—James B. Mullins
*Attorney*—William S. Wolfe, Frank L. Neuhauser, Oscar B. Waddell and Joseph B. Forman

[57] ABSTRACT

A manual/automatic station including two amplifiers and a switching circuit for interconnecting the amplifiers in either an automatic configuration or a manual configuration. In the automatic configuration, the two amplifiers are in series. In the manual configuration, the output of a circuit associated with the first amplifier receives a feedback current from the station load circuit. A shunt capacitor connected between an input to the first amplifier and the circuit output charges to the difference between a feedback voltage developed in the station load circuit and an automatic control signal. The output of the first amplifier, which becomes saturated in the manual configuration, is limited by Zener diodes. On return to the automatic configuration, the Zener-limited voltage across the shunt capacitor. The current establishes a ramp voltage across the input to the second amplifier and, consequently, across the load until the first amplifier is driven from saturation. The shunt capacitor passes changes in input signals to the second amplifier during ramping.

6 Claims, 4 Drawing Figures

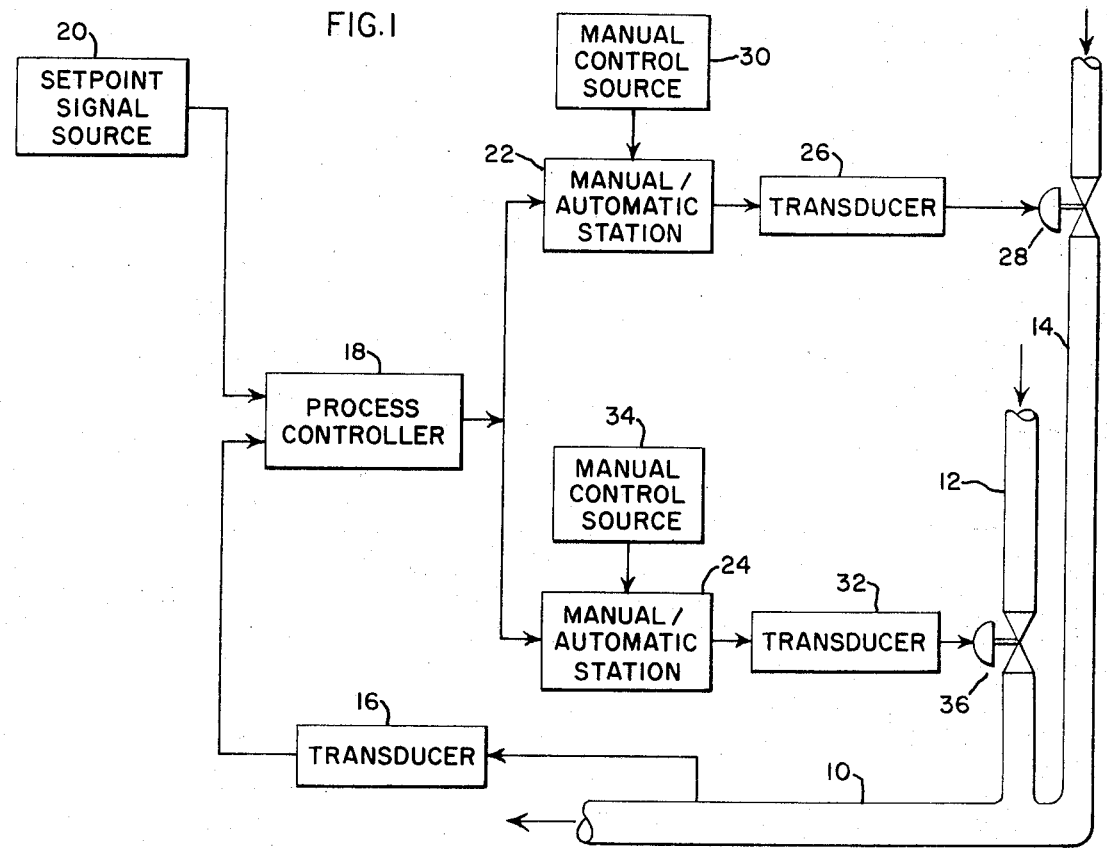
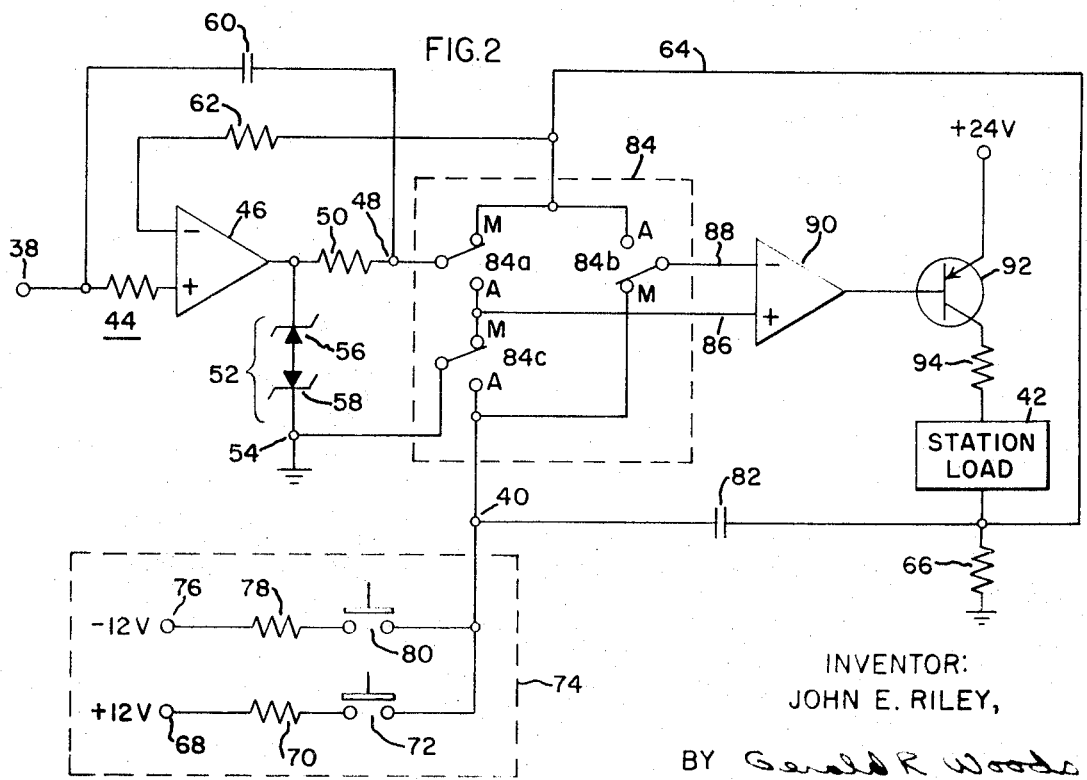

INVENTOR:
JOHN E. RILEY,

BY Gerald R Woods
HIS ATTORNEY.

MANUAL/AUTOMATIC STATION FOR USE IN PROCESS CONTROL SYSTEMS

BACKGROUND OF THE INVENTION

The present invention relates to analog process control devices and, more particularly, to a manual/automatic station for use with an analog process controller.

In a closed loop process control system of the analog type, a number of process variables are monitored by transducers, each of which generates an electrical signal having a magnitude proportional to the existing value of a particular process variable. Each of the generated signals, hereafter referred to as process variable signals, is applied to an analog process controller in which the process variable signal is compared to a setpoint signal proportional to either an optimum or a limiting value for the process variable. In the following description, it is assumed that the setpoint signal represents an optimum value. If a deviation exists between the process variable signal and the setpoint signal, the process controller generates a control signal which regulates the condition of a process-controlling device such as a motor-driven valve. The process-controlling device responds to the control signal to alter the operating level of the process so as to drive the process variable towards its setpoint. The closed loop including the process, the process transducer, the process controller, and the process-controlling device can be referred to as an automatic control loop.

For a number of reasons, an operator may want to manually control a particular process variable for a limited time. For example, an experienced operator may feel that it is better to control the process manually during startup or during planned changes in the level of process operation. In a conventional closed loop process control system, only one process-controlling device is connected to the output of a process controller. Manual control in such a system consists of adjustment by the operator of the setpoint signal applied to the process controller.

In some process control systems, more than one process-controlling device may be regulated by a single process controller. Assume for purposes of illustration that a single process controller is used to control valves in a number of feeder lines supplying fluid to a larger trunk line. In such a system, the process variable being monitored is usually the fluid flow through the trunk line. To permit an operator to manually control the flow of fluid through any one of the feeder lines, circuits called manual/automatic stations are interposed between a common output of the process controller and the process-controlling devices or valves for the individual feeder lines. Through the use of the manual/automatic station an operator can open the control loop for a selected feeder line and can manually control flow through the line. While the operator controls flow through the selected feeder line, the remaining feeder lines remain in automatic control loops and are regulated by control signals generated by the process controller. When an operator no longer wants to control a selected feeder line, control of that line is transferred back to the process controller.

To avoid disrupting the process, the transfer of control should be bumpless. That is, the transfer should be accomplished without sudden change in control current being applied to the transducers associated with the process-controlling devices. When a transducer is subjected to a current bump during transfer of control or any other time, it may drive its process-controlling device to an unintended position. If one of a plurality of process-controlling devices is forced to hunt for an intended position, after being subjected to a current bump, the process tends to be unstable as other process-controlling devices attempt to maintain the process at a fixed level of operation.

Although current bumps during the transfer of control are to be avoided for the above-discussed reasons, it is nevertheless desirable that each process-controlling device share the load when a change in the process level of operation occurs during transfer whether that process change is due to a change in actual process conditions or to a change in process setpoint. In short, each manual/automatic station should include means for effecting the gradual return of an associated process-controlling device from manual to automatic regulation while permitting the device to respond to changes in the process variable or setpoint.

In the past, manual/automatic stations have been used in which transfer from a manual mode of operation to an automatic mode was effected by having an operator manually adjust the station output to the level of output which would be required in the automatic mode. Once the manual adjustment of output was completed, control could be transferred, again manually, to the conventional automatic control system. This manual balance procedure was time-consuming and unsatisfactory since it depended entirely on the operator's expertise for its success.

Circuits exist for effecting a manual to automatic transfer without the manual balance procedure. These circuits do not, however, permit a process-controlling device to respond during transfer to changes in the process variable or the setpoint. Moreover, these circuits allow only exponential transfers which require an inordinate amount of time to complete.

SUMMARY OF THE INVENTION

To overcome these and other disadvantages of the prior art, the present invention contemplates a manual/automatic station which causes a load current to change in a ramp between a manually controlled value established while the station is in a manual configuration and an automatically controlled value established by a process controller when the station is switched to an automatic configuration. The station includes a differential amplifier having a first input terminal connected to the process controller, a second input terminal connected to the load circuit through a feedback path, and an output terminal connected to a first end of the output impedance. A shunt capacitor is connected between the first input terminal and the second end of the output impedance. When the station is in an automatic configuration, the output impedance is connected in circuit with the load circuit. When the station is in a manual configuration, the output impedance is connected in the feedback path. The differential amplifier saturates in the manual configuration and remains in saturation after return to automatic until current through the output impedance reduces the voltage across the shunt capacitor to a predetermined level.

DESCRIPTION OF THE DRAWINGS

While the specification concludes with claims particularly pointing out and distinctly claiming that which is regarded as the present invention, details of a preferred embodiment with its further objects and advantages may be more readily ascertained from the following detailed description when read in conjunction with the accompanying drawings in which:

FIG. 1 is a block diagram of a process control system including manual/automatic stations which can be constructed in accordance with the present invention;

FIG. 2 is a more detailed schematic diagram including a manual/automatic station constructed in accordance with the present invention;

DETAILED DESCRIPTION

System Description

Figure 3:
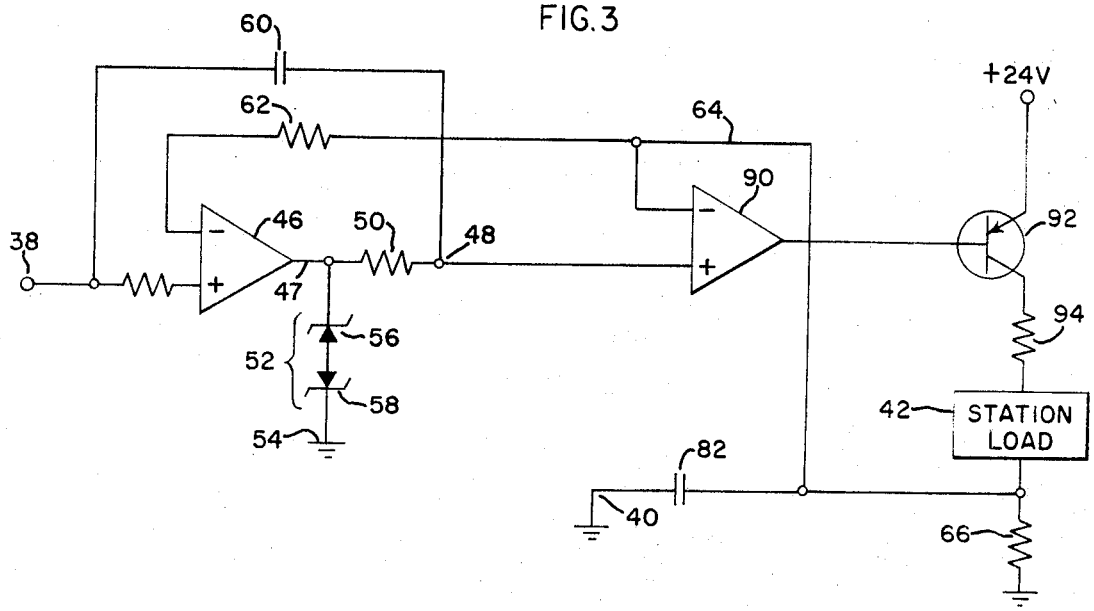
FIG. 3 is a simplified schematic diagram of the station illustrated in detail in FIG. 2 representing the station in an automatic configuration.

Referring to FIG. 1, the process variable being controlled is the fluid pressure in a trunk line 10 supplied by two smaller feeder lines 12 and 14. The level of pressure in the trunk line 10 is continuously monitored by a pressure transducer 16 which generates a proportional electrical signal, hereafter referred to as a process variable signal. The process variable signal is applied to one input of a process controller 18 having a second input from a setpoint signal source 20. If the process variable signal deviates from the setpoint signal, indicating that the pressure is not at its desired or setpoint level, the process controller 18 generates a control signal which is applied to manual/automatic stations 22 and 24. While two such stations are shown for purposes of illustration, it should be recognized that any reasonable number of stations could be connected to the output of the process controller is to control any number of feeder lines.

Manual/automatic station 22, described in detail later with reference to FIG. 2, includes switching means which permits the station to assume an automatic configuration. In this configuration the station repeats the output signal of the process controller 18 in transmitting it to a transducer 26. In the illustrated system, transducer 26 would be an electrical to mechanical transducer such as a servo motor. Transducer 26 controls the position of a valve 28 in feeder line 14 to regulate the fluid flow contributed by feeder line 14 to trunk line 10. The manual/automatic station 22 may also be configures in a manual configuration in which a manual control current provided by a source 30 supplies a driving current for the transducer 26. When the manual/automatic station 22 is in its manual configuration, the transducer 26 and valve 28 are effectively removed from the closed loop including process controller 18.

The manual/automatic station 24 is similar to station 22 in that it drives a transducer 32 either by repeating the automatic control signal generated by process controller 18 or by transmitting a manual control signal generated in a manual control current source 34. Transducer 32 controls the position of a valve 36 in feeder line 12 to regulate the amount of fluid contributed by feeder line 12 to trunk line 10.

Under certain conditions, an operator may want to control fluid flow through one of the feeder lines 12 and 14 manually while leaving the other feeder line under automatic control. For purposes of illustration, assume that feeder line 12 is contributing 40 percent of the total fluid flow needed to maintain a setpoint pressure in trunk line 10 while feeder line 14 is contributing the remaining 60 percent. If an operator wishes to reduce the flow of fluid through feeder line 12 while maintaining the pressure in the trunk line 10 at a setpoint level, switching means in manual/automatic station 24 are used to alter the configuration of station 24 to permit manual operation. In a preferred embodiment of station 24, the transfer from automatic to manual is accomplished without any change in the output of station 24. Therefore, immediately after transfer of station 24 to its manual configuration, the feeder lines 12 and 14 will continue to contribute 40 and 60 percent, respectively, of the fluid flow needed to maintain the setpoint pressure. An operator can, by controlling the current provided by source 34, then manually adjust the position of valve 36. Again, for illustrative purposes, assume that the operator wishes to cut the fluid flow through feeder line 12 to one-half of its former value to reduce the load on pumping equipment connected to feeder line 12. Closing the valve 36 reduces the fluid flow contributed to trunk line 10 by feeder line 12 to 20 percent of the amount needed to maintain the setpoint pressure. If the position of valve 28 and feeder line 14 were not changed, the new levels of fluid flow to the feeder lines 12 and 14 would provide only 80 percent of the fluid flow required in trunk line 10 to maintain the setpoint pressure.

However, the removal of manual/automatic station 24 from the closed loop including process controller 18 does not result in the removal of manual/automatic station 22 from that closed loop. When a deviation occurs between the setpoint signal and the process variable signal due to the closing of valve 36, process controller 18 applies a control signal to the transducer 26 through station 22 to open valve 28 whatever amount is necessary to increase the pressure in trunk line 10 to the setpoint level. If the amount of fluid contributed by feeder line 12 is reduced from 40 to 20 percent manually, the amount of fluid contributed by feeder line 14 is automatically increased from 60 to 80 percent.

When the operator no longer wants to manually control the flow through feeder line 12, the switching means in station 24 is used to return that station to its automatic configuration. To avoid abrupt changes in the discharge pressure in trunk line 10, a manual/automatic station constructed in accordance with the present invention provides a ramp output during transfer which linearly increases the fluid flow in feeder line 12 from the manually established 20 percent to the automatically established 40 percent, assuming that the setpoint has not changed. As the fluid flow to feeder line 12 increases, the fluid flow through feeder line 14 decreases linearly from the 80 percent to the 60 percent level due to normal automatic control action.

The preceding description assumes that the setpoint does not change during station transfers. If the setpoint does change, for example, by a +20 percent, process controller 18 generates a control signal which causes both valves 28 and 36 to open to increase fluid flow needed to maintain the increased level of pressure. In accordance with the invention, a valve responds to any change in the process controller output whenever the station associated with that valve is in an automatic configuration, even during ramping between manual and automatic operation.

Schematic Diagram of Manual/Automatic Station

Referring now to FIG. 2, the manual/automatic station shown there in detail has an input terminal 38 for receiving the output signal provided by a process controller. In the following description, the controller signal is referred to as an automatic control signal to distinguish it from a manual control signal applied to the station at a manual input terminal 40. An output current generated in the station, whether in an automatic configuration or a manual configuration, is applied to a station load circuit including a load 42 which may be the electrical system of an electrical to mechanical transducer such as a servo motor. The load circuit also includes a feedback resistor 66 in series with load 42.

The station includes a first amplifier circuit 44 including a high input impedance differential amplifier 46 having a normal or non-inverting input connected to the input terminal 38. An output terminal 47 of the amplifier 46 and a circuit output terminal 48 are connected through first and second leads to an output impedance 50. Impedance 50 preferably has resistive characteristics only. The maximum positive or negative voltages which can appear at the output of amplifier 46 is restricted by voltage-limiting circuit 52 consisting of a pair of inversely poled Zener diodes 56 and 58 connected in series between the output terminal of amplifier 46 and an electrical ground terminal 54. The input terminal 38 and the output terminal 48 of the first amplifier circuit 44 are connected through a shunt capacitor 60. The shunt capacitor 60 is used to accomplish manual-to-automatic ramp transfer in a mode of operation described in detail later in this specification. The second or inverting input to the differential amplifier 46 is connected to a feedback loop including a resistor 62 connected directly through a conductor 64 to the upper end of the feedback resistor 66. The feedback resistor 66, which has a relatively low ohmic value, is subject to the station load current and provides a feedback voltage directly proportional to the current through station load 42.

The manual control current source 74 for the station includes a positive DC voltage source 68 connected to the manual input terminal 40 through a current-limiting resistor 70 and a normally open pushbutton 72. The manual control current source 74 also includes a negative DC voltage source 76 connected in series with a current-limiting resistor 78 and a second normally open pushbutton 80. When the station is in a manual configuration, an operator can alter the current applied to the manual input terminal 40 by depressing one or the other of the pushbuttons 72 and 80, thereby varying the charge on an integrating capacitor 82 connected between terminal 40 and the upper end of feedback resistor 66. A more detailed description appears in a later section of this specification.

The manual input terminal 40, the circuit output terminal 48, and the feedback conductor 64 are connected to a switching means or switching section 84 consisting of three subsections 84a, 84b, 84c. Each of the subsections in the switching section 84 includes a movable contact and a pair of stationary contacts designated as A and M contacts. When the station is in its automatic configuration, the movable contact in each subsection is electrically connected to the stationary A contact. Similarly, when the station is in its manual configuration, the movable contact in each subsection is electrically connected to the stationary M contact. A pair of output leads 86 and 88 from the switching section 84 are connected to non-inverting and inverting input terminals of a second high input impedance amplifier 90.

The output of amplifier 90 is connected to a current amplifier comprising a PNP transistor 92 having its emitter terminal connected to a positive voltage source and its collector terminal connected to the station load 42. The current flowing in the emitter circuit of transistor 92 is a function of the output current of amplifier 90.

Figure 4:
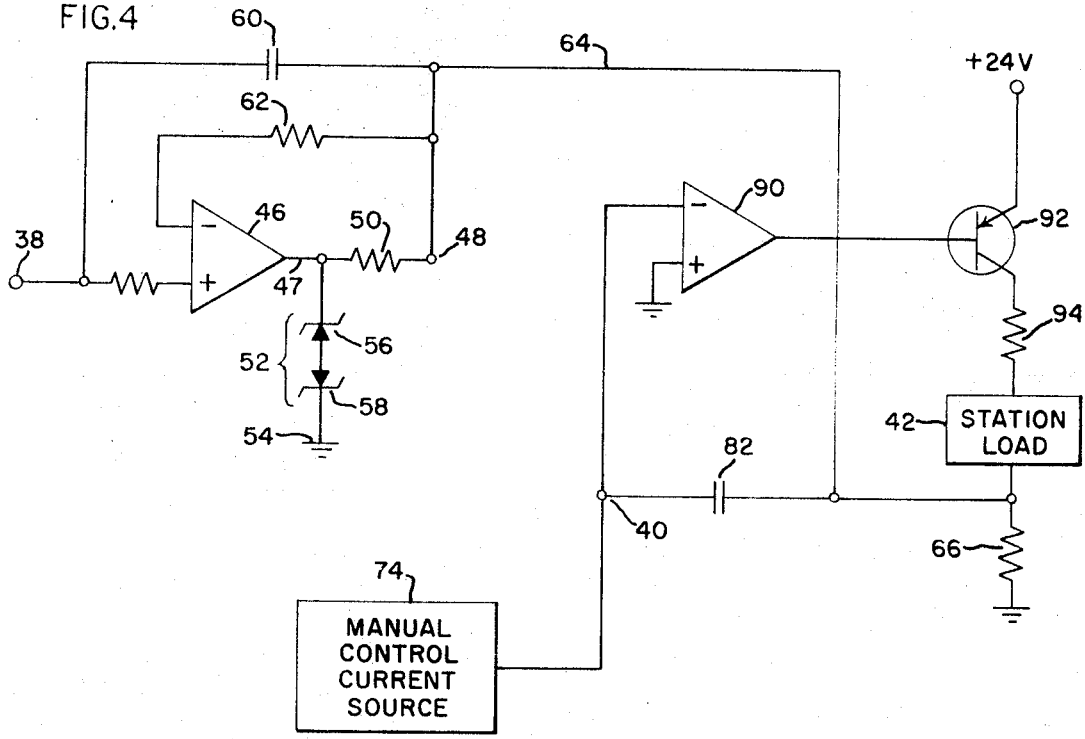
FIG. 4 is a simplified schematic diagram of the station illustrated in detail in FIG. 2 showing the station in a manual configuration.

Simplified schematic diagrams in FIGS. 3 and 4 are to be used to help explain the operation of the manual/automatic station described above during normal operation in its automatic and manual configurations, and during transfers between manual and automatic. The details of the subsections in switching section 84 have been eliminated by not showing open-circuited leads and by showing direct electrical connections in place of connections through stationary and movable contacts. To simplify the description and to permit cross reference between FIG. 2 and FIGS. 3 and 4, the numerical designations of components in the former figure are retained in the latter figures.

Automatic to Manual Transfer

When the station is in its automatic configuration, the manual/automatic station repeats the controller signal applied to terminal 38. The path of the controller signal includes the shunt capacitor 60, the first differential amplifier 46, the output resistor 50, the second differential amplifier 90, the PNP transistor 92, the station load 42, and feedback resistor 66. Gain-stabilizing feedback voltage is provided to differential amplifier 46 and to differential amplifier 90 through conductor 64 to limit the overall station gain to unity. This feedback voltage is applied to the inverting input terminal of amplifier 46 through the resistor 62 and directly to the inverting input terminal of amplifier 90. In a preferred embodiment of the invention, the output voltage of the amplifier 46 and the voltage across feedback resistor 66 varies through a 1 to 5 voltage range. With the station in its automatic configuration, the manual input terminal 40 is connected to ground to effectively connect the integrating capacitor 82 in parallel with the feedback resistor 66.

During normal automatic operation, amplifier 46 is not saturated. The 1-5 voltage signal appearing at output terminal 47 is a function of the input signal on terminal 38 and is less than the breakdown voltages of either of Zener diodes 56 and 58.

The station is transferred from its automatic to its manual configuration by moving the movable contacts in the subsections 84a, 84b and 84c of switching section 84 to provide direct electrical connections to the M contacts. In a preferred embodiment of the invention, the switching section 84 is controlled by a single manual/automatic transfer relay (not shown) so that the switching in the subsections is completed virtually simultaneously. When the switching action has been completed, the station assumes the manual configuration shown in simplified from in FIG. 4. In this configuration, the output of the first differential amplifier 46 is disconnected from the input to second differential amplifier 90 and is connected in feedback relationship to the feedback resistor 66. The manual control current source 74 is connected to the inverting input terminal of the second differential amplifier 90 while the non-inverting input terminal of amplifier 90 is connected to ground.

It was noted that the capacitor 82 is connected in parallel with the feedback resistor 66 during automatic operation and charges to the level of the feedback voltage. It was also noted that the manual input terminal 40 is grounded in the automatic configuration. At the time of transfer to the manual configuration, the voltage at manual input terminal 40 and consequently on the inverting input terminal of amplifier 90 is at ground potential. Since the non-inverting input terminal for the amplifier 90 is connected to ground in the manual configuration, both inputs to amplifier 90 are at ground potential immediately after transfer. Since no differential voltage is established across inputs to amplifier 90 during the automatic-to-manual transfer, the output of amplifier 90 remains at the level established during the stable automatic operation just prior to transfer to manual.

When the station is operating in its manual configuration, the current supplied to the station load 42 is varied by adjusting the amount of current supplied by source 74 to the manual input terminal 40. After the charge on capacitor 82 is altered, the high input impedance of amplifier 90 prevents capacitor 82 from discharging to any significant extent. The capacitor provides integrating action for current supplied by current source 74 to change the load current and feedback voltage to a desired level.

Manual to Automatic Transfer

When the station is in a manual configuration, the shunt capacitor 60 in the first amplifier circuit 44 charges to a voltage equal to the difference between the feedback voltage across resistor 66 and the controller voltage which is applied continually to input terminal 38. Because the controller voltage, which changes after transfer for reasons discussed earlier, is continually applied to the non-inverting input of amplifier 46 while a normally different manually controlled feedback voltage is applied to the inverting input terminal through resistor 62, a continual differential voltage exists which drives the amplifier 46 into saturation during manual operation. Depending on the polarity of the amplifier output, one or the other Zener diodes 56 and 58 breaks down to clamp the amplifier output to either a positive or negative voltage limit. For purposes of illustration, assume that the load current has been increased through the use of source 74 during manual operation and that the capacitor 60 carries a more positive potential at its connection to terminal 48 than at its connection to terminal 38. Under these conditions, the first differential amplifier 46 would produce a maximum negative voltage limited by the breakdown voltage of the Zener diode 58.

When the subsections 84a, 84b, 84c of switching section 84 are moved to the stationary A contacts to effect the return to the automatic configuration, the right-hand plate of capacitor 60 is connected to the junction 48 between the output resistor 50 in the first amplifier circuit 44 and the non-inverting input terminal of the high input impedance amplifier 90. The voltage on the right-hand plate capacitor 60 is equal to the feedback voltage at the time of transfer. The feedback voltage is also applied to the inverting input of the second differential amplifier 90 in the automatic configuration through feedback conductor 64 and switching subsection 84b. Therefore, at the instant after transfer to the automatic configuration, no differential voltage exists across the inputs of the amplifier 90 and the output of that amplifier remains at the pre-transfer level.

Immediately after transfer, the first differential amplifier 46 is still in saturation and a diode-limited negative voltage exists on amplifier output terminal 47. Since the voltage on terminal 48 is more positive than the voltage at terminal 47, a current flow is established through output resistor 50 that tends to reduce the voltage across capacitor 60. As the current through output resistor 50 changes the voltage at terminal 48, a differential voltage is established across the inputs to the second differential amplifier 90. The changing output of that amplifier drives the load current and consequenly the feedback voltage toward the valves called for by the automatic control signal voltage. The changing feedback voltage applied to the inverting input of amplifier 46 through resistor 62 reduces the differential voltage across the inputs of amplifier 46. When the differential voltage is reduced to a certain level, the first differential amplifier 46 is driven from saturation to end the ramping period. Subsequently, the current through output resistor 50 becomes a function of the automatic control signal alone.

While the rate of change of voltage at the terminal 48 during transfer back to automatic is established by shunt capacitor 60, output resistor 50 and the diode-limited output voltage of the saturated amplifier 46, the absolute voltage at terminal 48 and consequently the current through load 42 is a function of this established voltage and also of any changes in input voltage applied to terminal 38 during ramping. For example, assume that during manual operation the feedback voltage equalled 4 volts while the input voltage at terminal 38 equalled 1 volt. The shunt capacitor 60 would charge to a voltage of 3 volts. At the time of return to automatic, the voltage across capacitor 60 decreases due to current through the output resistor 50. If, after the voltage at terminal 48 had changed to an assumed value of 3.0 volts, the controller signal applied to terminal 38 increased suddenly from 1.0 to 1.5 volts due to a change either in the setpoint signal or in the process variable signal being applied to the process controller, the 0.5 volt increase in the input signal would be shunted through capacitor 60 to terminal 48 to raise the potential at that terminal to 3.5 volts. The increased potential at terminal 48 would cause amplifier 90 to increase the current to the station load 42. Since the 2.0 volt potential across the capacitor 60 would not be altered by the changes in the input signal, the voltage across capacitor 60 would continue to decrease from 2.0 volts toward 0 volts until the amplifier 46 is driven from saturation.

There has been described a manual/automatic station in which a ramp voltage is generated to provide gradual transfer from manual to automatic operation while concurrently permitting the output of the manual/automatic station to follow changes in station input. While the station as described is a preferred embodiment of the invention, variations and modifications will occur to those skilled in the art once they become familiar with the invention. Therefore, it is intended that the appended claims shall be construed to include all such variations and modifications as fall within the true spirit and scope of the invention.

I claim:

1. A manual/automatic station connected between a process controller and a load circuit, means for providing a ramp change in load current between a manually controlled load current established while the station is in a manual configuration and an automatically controlled load current established by the process controller when the station is switched to an automatic configuration, comprising:
   a. a differential amplifier having a first input terminal connected to the output of the process controller, a second input terminal, and an output terminal;
   b. an output impedance having a first end connected to the output terminal;
   c. a shunt capacitor connected between a second end of said output impedance and the first input terminal;
   d. means for connecting the second end of said output impedance in circuit with the load while the station is in the automatic configuration; and
   e. means for applying a load feedback signal to the second input terminal continually and to the second end of said output impedance only while the station is in the manual configuration, said differential amplifier being driven into saturation when the station is in the manual configuration and being driven from saturation when the station returns to an automatic configuration only after the voltage across said shunt capacitor has been reduced to a predetermined level by current through said output impedance.

2. A manual/automatic station of the type recited in claim 1 further including means for limiting the output voltage of said differential amplifier during saturation to improve the linearity of the ramp change in load current.

3. A manual/automatic station of the type recited in claim 2 wherein said voltage-limiting means includes a pair of inversely poled, serially connected voltage breakdown devices connected between the output terminal of said differential amplifier and an electrical ground terminal.

4. A manual/automatic station of the type recited in claim 1 further including
   a. a second differential amplifier having first and second input terminals and an output terminal connected to the load circuit;
   b. an integrating capacitor having a first terminal connected to said load circuit for receiving a load feedback signal;
   c. a manual control current source for selectively altering the level of load current while the station is in the manual configuration, the output of said current source being electrically connected to a second terminal of said integrating capacitor;
   d. means for establishing the following electrical connections while the station is in an automatic configuration
      1. the first input terminal of said second differential amplifier to the second end of said output impedance,
      2. the second input terminal of said second differential amplifier to the load circuit to receive a feedback signal, and
      3. the second terminal of said integrating capacitor to the electrical ground terminal; and
   e. means for establishing the following electrical connections while the station is in a manual configuration
      1. the first input terminal of said second differential amplifier to the electrical ground terminal, and
      2. the second input terminal of said second differential amplifier to the second terminal of said integrating capacitor.

5. A manual/automatic station of the type recited in claim 4 further including means for limiting the output voltage of said differential amplifier during saturation to improve the linearity of the ramp change in load current.

6. A manual/automatic station of the type recited in claim 5 wherein said voltage-limiting means includes a pair of inversely poled, serially connected voltage breakdown devices connected between the output terminal of said differential amplifier and an electrical ground terminal.

* * * * *

UNITED STATES PATENT OFFICE
CERTIFICATE OF CORRECTION

Patent No. 3,662,275                    Dated  May 9, 1972

Inventor(s) John E. Riley

It is certified that error appears in the above-identified patent and that said Letters Patent are hereby corrected as shown below:

In the Abstract, line 15, after "voltage" insert -- provides a current which reduces the voltage --.

Signed and sealed this 5th day of September 1972.

(SEAL)
Attest:

EDWARD M.FLETCHER,JR.                ROBERT GOTTSCHALK
Attesting Officer                    Commissioner of Patents